United States Patent
McPheat

(10) Patent No.: US 10,040,012 B2
(45) Date of Patent: Aug. 7, 2018

(54) FILTRATION SYSTEMS

(71) Applicant: FILTERCORP INTERNATIONAL LIMITED, Auckland (NZ)

(72) Inventor: Kevin Harold McPheat, Auckland (NZ)

(73) Assignee: FILTERCORP INTERNATIONAL LIMITED, Auckland (NZ)

( * ) Notice: Subject to any disclaimer, the term of this patent is extended or adjusted under 35 U.S.C. 154(b) by 0 days.

(21) Appl. No.: 14/757,463

(22) Filed: Dec. 23, 2015

(65) Prior Publication Data

US 2016/0114274 A1    Apr. 28, 2016

Related U.S. Application Data

(63) Continuation-in-part of application No. PCT/IB2014/062645, filed on Jun. 27, 2014.

(30) Foreign Application Priority Data

Jun. 27, 2013   (NZ) ..................................... 612601

(51) Int. Cl.
  *B01D 46/00*   (2006.01)
  *B01D 46/02*   (2006.01)
  *F24F 7/00*    (2006.01)

(52) U.S. Cl.
  CPC ....... *B01D 46/002* (2013.01); *B01D 46/0005* (2013.01); *B01D 46/02* (2013.01);
  (Continued)

(58) Field of Classification Search
  CPC .... B01D 46/002; B01D 46/023; B01D 46/02; B01D 46/0005; F24F 2007/003; F24F 7/00
  See application file for complete search history.

(56) References Cited

U.S. PATENT DOCUMENTS 2,282,733 A * 5/1942 Malloy ............... F24F 7/00
                                            454/330
2,853,153 A * 9/1958 Sexton ............ B60H 1/00414
                                            180/68.3
(Continued)

FOREIGN PATENT DOCUMENTS

CA    2300441 A1 * 12/2000 ............. F24F 13/24
CA    2763183 A1 *  7/2013 ............. F24F 13/20
(Continued)

OTHER PUBLICATIONS

Purchas and Sutherland, Handbook of Filter Media, 1996, pp. 153-200, Elsevier Advanced Technology: GB, UK.
(Continued)

*Primary Examiner* — Jeanette E Chapman
(74) *Attorney, Agent, or Firm* — Whitham & Cook, PC

(57) ABSTRACT

A gas filtration system including an orificed barrier having a plurality of orifices through which gas can be forced, each orifice being sealed by a filter bag via which said air can pass and be filtered, each filter bag having a mouth opening biased to an open condition to force a mouth opening seal of the filter bag against a seat of the orifice by an underlying resiliently deflectable band that is deformable inwardly to facilitate the seating with yet allow removal of the filter bag from the barrier, each filter bag defining a passage but with an enclosed end region such that at least some solid matter can be filtered from the passing air and is contained inside the bag.

24 Claims, 7 Drawing Sheets

(52) U.S. Cl.
CPC .............. *B01D 46/023* (2013.01); *F24F 7/00* (2013.01); *F24F 2007/003* (2013.01)

(56) References Cited

U.S. PATENT DOCUMENTS

| | | | | |
|---|---|---|---|---|
| 3,041,808 A * | 7/1962 | Snyder | ................ | B01D 39/086 55/304 |
| 3,256,679 A * | 6/1966 | Snyder | .............. | B01D 46/0005 55/293 |
| 3,354,620 A * | 11/1967 | Scholl | ............... | B01D 46/0005 55/304 |
| 3,406,502 A * | 10/1968 | Wiik | .................. | B01D 46/0067 285/260 |
| 3,550,358 A * | 12/1970 | McCabe | ........... | B01D 46/0005 55/305 |
| 3,726,066 A * | 4/1973 | Colley | ............... | B01D 46/0068 55/302 |
| 3,739,557 A * | 6/1973 | Anderson | .............. | B01D 46/04 55/302 |
| 3,871,845 A * | 3/1975 | Clarke | ............... | B01D 46/0005 55/284 |
| 4,015,961 A | 4/1977 | Howard et al. | | |
| 4,042,356 A | 8/1977 | Miller | | |
| 4,058,379 A * | 11/1977 | Cheng | ................ | B01D 46/0068 55/302 |
| 4,113,455 A * | 9/1978 | Richmond | ......... | B01D 46/0005 55/378 |
| 4,244,718 A * | 1/1981 | Noddin | .................. | B01D 46/06 55/377 |
| 4,297,113 A * | 10/1981 | Theodore | ........... | B01D 46/0095 55/341.1 |
| 4,310,336 A | 1/1982 | Peterson | | |
| 4,481,022 A * | 11/1984 | Reier | ...................... | B01D 46/06 29/446 |
| 4,504,293 A * | 3/1985 | Gillingham | ........ | B01D 46/0005 55/302 |
| 4,543,113 A * | 9/1985 | Forester | ............... | B01D 39/086 501/95.1 |
| 4,645,520 A * | 2/1987 | Huttlin | ................ | B01D 46/0005 55/302 |
| 4,854,953 A * | 8/1989 | Van Weerden | .... | B01D 46/0013 55/483 |
| 4,889,452 A * | 12/1989 | Heyl | ...................... | B65G 53/66 406/109 |
| 5,061,303 A | 10/1991 | Williams et al. | | |
| 5,173,094 A * | 12/1992 | Brady | ..................... | B08B 15/00 423/210 |
| 5,318,606 A * | 6/1994 | Geibel | .................. | B01D 46/24 55/309 |
| 5,785,724 A | 7/1998 | Johnson | | |
| 6,149,716 A * | 11/2000 | Bach | .................. | B01D 46/0068 55/283 |
| 6,402,613 B1 * | 6/2002 | Teagle | .................. | F04D 19/002 454/195 |
| 6,676,720 B1 * | 1/2004 | Simonsen | .......... | B01D 46/0031 55/283 |
| 6,786,946 B2 * | 9/2004 | Jung | .................... | B01D 46/002 55/302 |
| 7,776,117 B2 * | 8/2010 | Regnier | ............. | B01D 46/0005 55/378 |
| 8,628,605 B2 * | 1/2014 | Doehla | ............... | B01D 46/0068 55/378 |
| 2003/0097935 A1 * | 5/2003 | Burkhart | ............ | B01D 46/0001 95/273 |
| 2004/0014421 A1 * | 1/2004 | Raymer | .................... | F24F 7/00 454/271 |
| 2004/0047776 A1 * | 3/2004 | Thomsen | .................. | A61L 2/10 422/186.07 |
| 2006/0174768 A1 | 8/2006 | Taylor et al. | | |
| 2009/0145094 A1 * | 6/2009 | Johnson | ................. | B01D 46/02 55/341.2 |
| 2010/0192528 A1 * | 8/2010 | Mann | .................. | B01D 46/0005 55/483 |
| 2014/0237957 A1 * | 8/2014 | Kohn | .................. | B01D 46/0016 55/341.1 |
| 2014/0360371 A1 * | 12/2014 | Seitz | ................... | B01D 46/0005 95/286 |
| 2016/0030871 A1 * | 2/2016 | Krause | ............... | B01D 46/0005 96/108 |
| 2017/0259199 A1 * | 9/2017 | Arrazola De Onate | ................... | B01D 46/023 |
| 2018/0065071 A1 * | 3/2018 | Kim | ..................... | B01D 46/023 |

FOREIGN PATENT DOCUMENTS

| | | | | |
|---|---|---|---|---|
| CN | 2186105 Y | | 12/1994 | |
| DE | 19623708 C1 | * | 12/1997 | ............... F24F 7/00 |
| DE | 10134839 A1 | * | 2/2003 | ............. A62C 2/065 |
| DE | 202012104425 U1 | * | 1/2013 | ............... F16L 5/04 |
| EP | 751814 B1 | | 4/1998 | |
| NZ | 547189 A | | 12/2007 | |
| WO | WO-0239026 A1 | * | 5/2002 | ............ F24F 13/068 |
| WO | 2005093334 A1 | | 10/2005 | |
| WO | 2007/133094 A1 | | 11/2007 | |
| WO | WO-2011096186 A1 | * | 8/2011 | ............... F24F 7/00 |

OTHER PUBLICATIONS

Horrocks and Anand, Handbook of Technical Textiles, 2000, pp. 316-327, Woodhead Publishing Limited in association with the The Textile Institute: Cambridge, England, ISBN 1 85573 385 4.

APTI Course SI: 445—Introduction to Baseline Source Inspection Techniques—Self-Instructional Guidebook, Sep. 18, 2012, pp. 35-54, U.S. Environmental Protection Agency, BiblioGov.

* cited by examiner

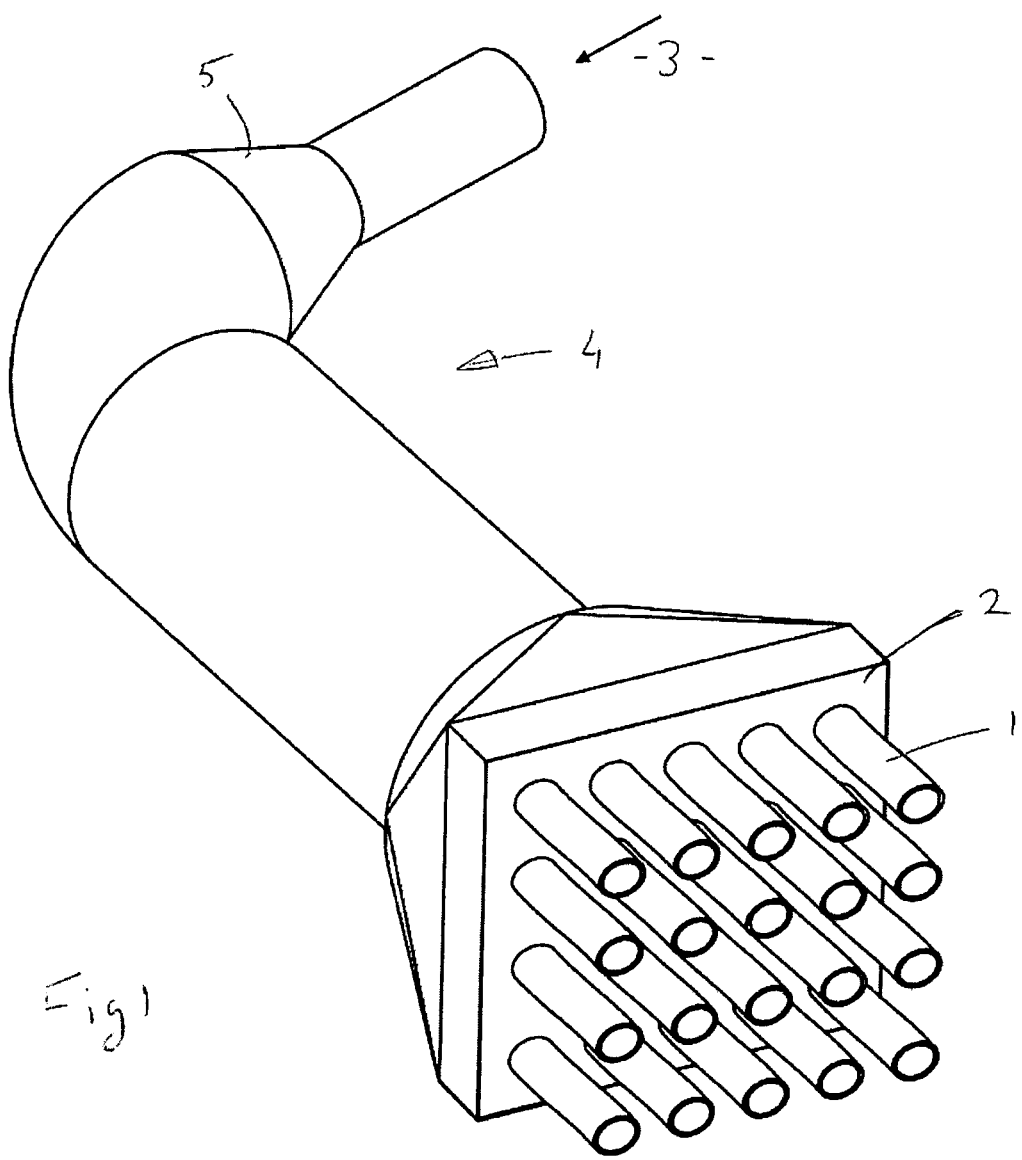

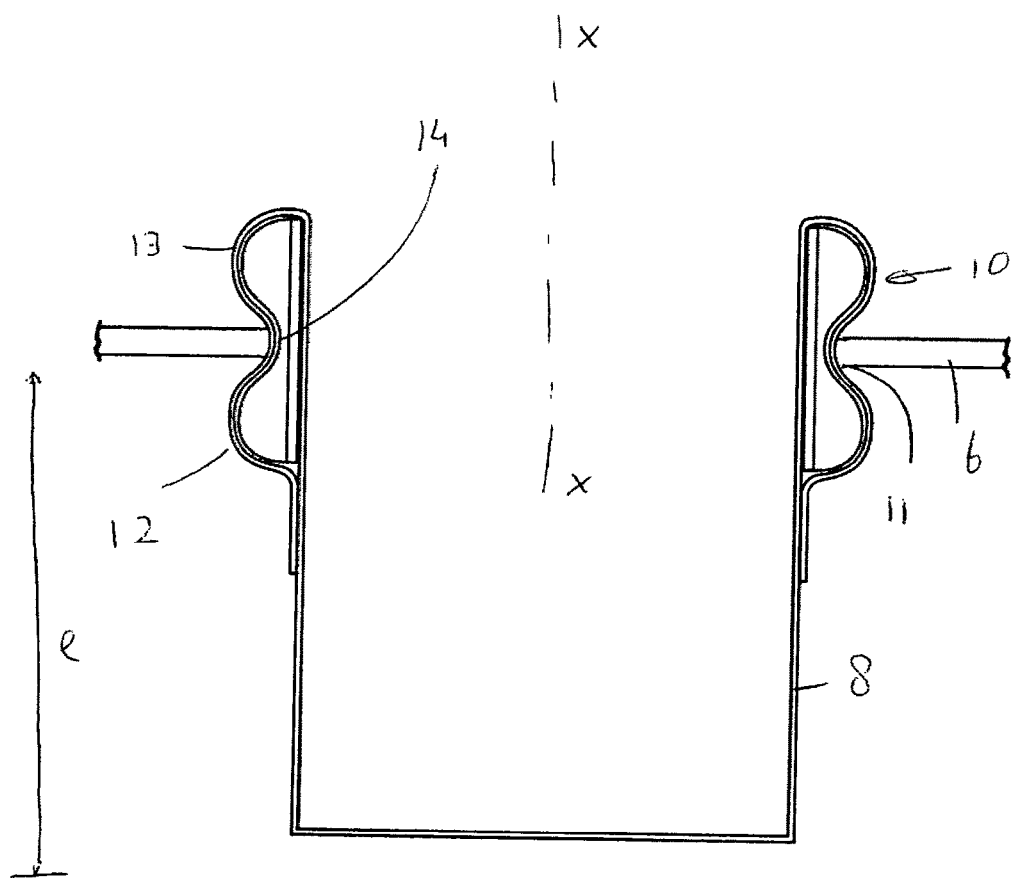

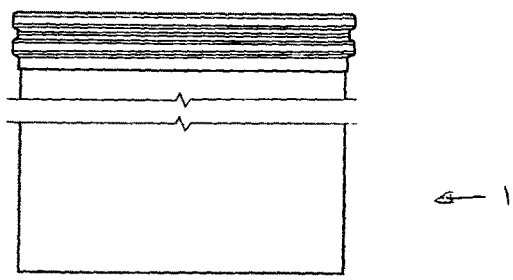
Fig 7
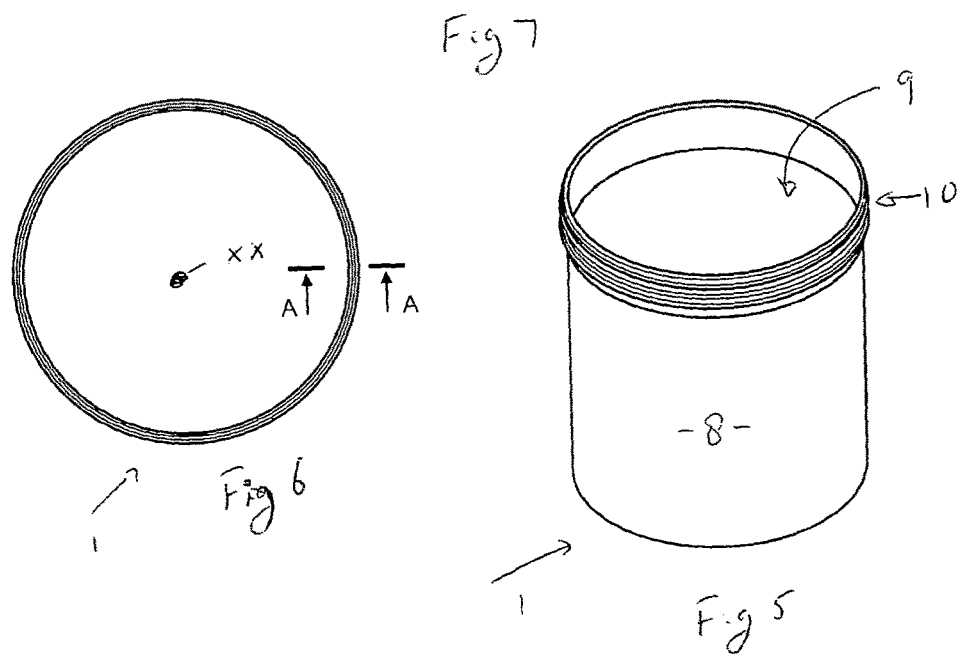
Fig 6
Fig 5
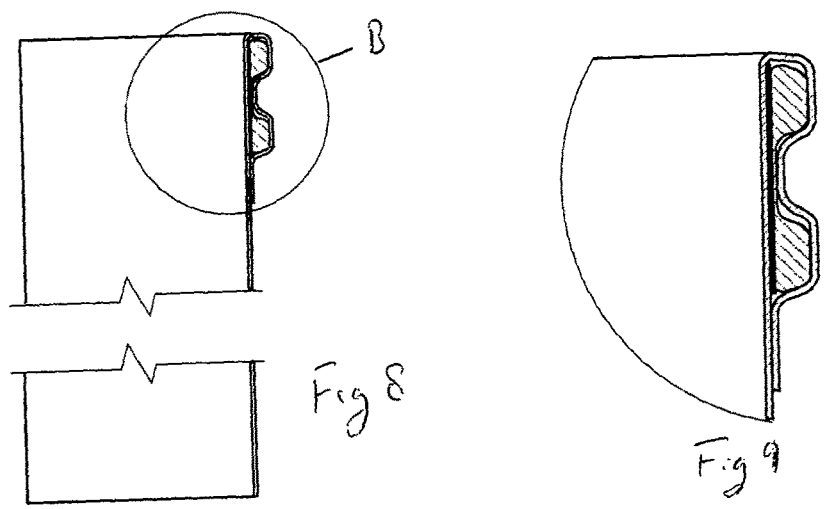
Fig 8
Fig 9

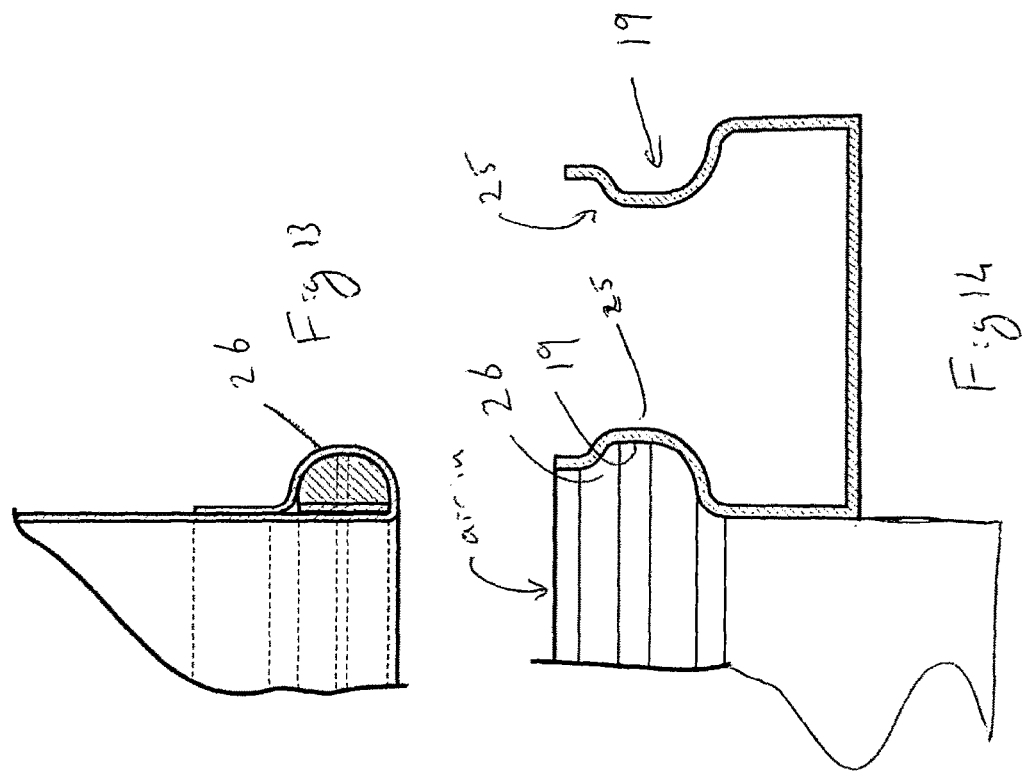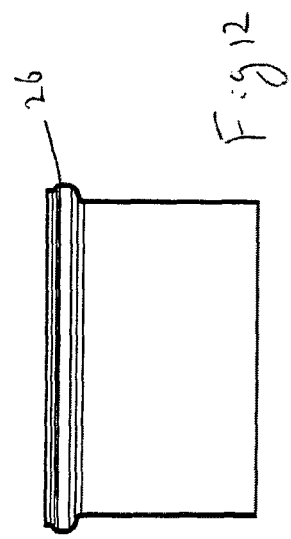

FILTRATION SYSTEMS

CROSS-REFERENCE TO RELATED APPLICATIONS

This application is a continuation-in-part of Patent Application Number PCT/IB2014/062645, filed Jun. 27, 2014, the complete contents of which are herein incorporated by reference.

FIELD OF THE INVENTION

This invention relates to apparatus and system suitable for air filtration. In particular though not solely the invention provides improvement in or relating to apparatus and system suitable for air filtration for buildings and in particular commercial building such as but not limited to factories, warehouses, office blocks, storage units, and retail buildings.

BACKGROUND

Buildings such as factories are often ventilated to ensure air circulation. Factories where foods are prepared will typically operate at a positive pressure compared to ambient. Air is drawn in from the outside by fans and is blown into the factory via ducting. Operating at a positive air pressure will ensure that external contaminants are not drawn into the factory via door and other openings. Airflow will be in an outward direction through such openings.

Air being blown in by the fans will itself carry contaminants such as pollen, bugs and other items undesirable inside the factory. These need to be filtered. Current air filtration systems rely on multistage filtration. Ambient air will pass through several banks of filters before entering the factory proper. Air will first encounter course filters and gradually be blown (or sucked) through finer filters. Each filter taking away more contaminants in the airflow so that sufficiently clean air makes its way into the factory.

The patent specification of U.S. Pat. No. 4,197,099 shows a typical filter arrangement that may be used where a frame is provided against which a filter bag is able to be clipped. The filter bag has a perimeter frame itself that provides for perimeter contact to be established between the filter bag and the frame with a view to sealing between. The frame and the filter bag are ideally sealed to each other by the use of a compression force and appropriate interface material selection. Clips, as shown in U.S. Pat. No. '099, may be used to help this. Clips are used in order to allow for a quick filter change to occur from time to time. Filters may be removed and replaced once they become sufficiently clogged up. Some filters are able to be cleaned and reused. Having a quick fit mechanism for removing and replacing filters is an advantage.

But contaminants can still find a way past the filters because only slight or no pressure exists between the filter frame and the main frame midway between the corners and where the clips are acting. Contaminants such as bugs like flies and other small insects are known to be able to make their way past the interface of the frame and the filter.

There is hence a need for an improved filtration system and related component that provide a better barrier to contaminants and/or that will at least provide the public with a useful choice.

SUMMARY

In a first aspect the present invention may be said to be a gas filtration system comprising:

an orifice plate having at a plurality of orifices through each of which a solid contaminant containing stream of gas to be filtered can pass from one body of gas to a second body of gas via a filter bag associated with each said orifice, each filter bag comprising an enclosed end region and a flexible ring interface region having a central ring axis and able to seal with said orifice plate in the orifice and that is annularly supported by a band, the band being resilient so as to be deformable inwardly towards the ring axis to facilitate insertion and removal of the filter bag from the orifice plate but with sufficient return bias to a more relaxed condition to hold the bag from separation with the orifice plate and seal therewith in a manner so that gas must pass through the filter bag to move from said one body of gas to said second body of gas, and wherein the filter bags extend from said orifice plate into the second body of gas, the pressure of gas of the one body of gas being higher than the pressure of gas in the second body of gas into which the filter bags extend such that solid contaminant filtered from the gas is trapped inside of the bag.

Preferably the orifice plate locally separates two bodies of gas that are in communication with each other only via each said filter bag.

Preferably each orifice and band of each associated filter bag form a female/male relationship.

Preferably said ring interface region comprises two axially spaced ribs between which the orifice plate locates for engagement to hold the bag from separation with the orifice plate.

Preferably the ribs are parallel and concentric.

Preferably the two ribs are part of said band.

Preferably the band has a resilient cylindrical ring that underlies a profiled ring, that profiled ring providing the ribs of the band.

Preferably said filter bag comprises of a flexible sock.

Preferably the orifice plate defines a circular seat at each orifice for said flexible ring interface to seat with.

Preferably the said orifice plate is of less than 10 mm thick.

Preferably the said orifice plate is of less than 5 mm thick.

Preferably said filter bag comprises a filter bag body made from a mesh.

In one embodiment the length of the body is about 50, 100, 150, 200, 250, 300, 350, 400, 450, 500, 550, 600, 650 or 700 mm.

In one embodiment the length of the body is between about 250 mm and about 450 mm in length.

In one embodiment the length of the body is between about 300 mm and about 400 mm in length.

In one embodiment the diameter of the ring interface is about 100, 150, 200, 250, 300, 350, 400, 450, 500 or 550 mm.

In one embodiment the diameter of the ring interface is about 200 mm to about 300 mm. In one embodiment the ratio between the diameter of the ring interface:the length of the body is about 1:0.5, 1:0.75, 1:1, 1:1.25, 1:1.5, 1:1.75, 1:2, 1:2.25, 1:2.5, 1:2.6, 1:2.7, 1:2.8, 1:2.9, 1:3, 1:3.1, 1:3.2, 1:3.3, 1:3.4, 1:3.5, 1:4, 1:5, 1:6 or 1:7.

In one embodiment the ratio between the diameter of the ring interface:the length of the body is about 1:1 to about 1:2.

In one embodiment the ratio between the diameter of the ring interface:the length of the body is about 1:1.2 to about 1:1.8.

Preferably the body is able to hang in a flaccid condition when there is no airflow passing through the orifice, and yet to balloon out when there is airflow passing through the orifice.

Preferably the body is of a length which permits the body to hang in a flaccid condition when there is no airflow passing through the orifice, and yet to balloon out when there is airflow passing through the orifice.

Preferably the body is able to balloon out to a condition wherein a central longitudinal axis of the body is perpendicular to the orifice plate.

Preferably the body is able to balloon out to a condition wherein a central longitudinal axis of the body is horizontal.

Preferably the filter bag is supported only at the ring interface region by coupling to the orifice plate.

Preferably the body has an enclosed end region distal from the ring interface.

Preferably the filter bag may hang in a flaccid condition when there is no airflow passing through the orifice, and wherein in its flaccid condition, the enclosed end region of the body hangs below the ring interface.

Preferably the mesh is a 150-800 micron mesh.

Preferably said filter bag filters insects and/or other flying and/or airbourne contaminants from air flowing into a building.

Preferably a pressure differential is able to be established between the two bodies of air.

Preferably the pressure differential is caused by a gas displacer.

Preferably the gas displacer is a fan or pump or blower.

Preferably the filter bags are filter socks.

Preferably the filter bags extend into the second body of gas a distance that is greater than the diameter of the orifice at where the bag is secured.

Preferably the orifice is circular and of a diameter greater than 70 mm and less than 700 mm.

Preferably the orifice is circular and of a diameter greater than 100 mm and less than 400 mm.

Preferably the orifice plate holds all said filter bags.

Preferably only the orifice plate holds said filter bags.

Preferably the orifice plate is planar and said orifices are defined in plane.

Preferably the orifice plate is of a sheet metal.

Preferably the orifice plate is installed in a vertical or horizontal condition.

Preferably the filter bags generally extend in a horizontal direction.

Preferably the filter bags are elongate socks and their elongate direction extends in a direction parallel to the normal of the orifice plate.

Preferably the band of each filter bag is adapted and configured to be in a complementary manner with said orifice able to secure to said orifice plate.

Preferably the seated condition, the mouth opening has been biased back to a relaxed condition yet causing forced contact between the cuff and the seat.

Preferably the forced contact is in a radial direction.

In a further aspect the present invention may be said to be an air filtration system comprising:

an airflow baffle having a plurality of orifices through each of which a solid contaminant containing stream of air to be filtered can displace from a first body of air on one side of the baffle to a second body of air on the other side of the baffle and via a filter bag associated with each said orifice, each filter bag being elongate and having an enclosed end region and comprising a flexible ring interface region to seal with a seat of said orifice and that is annularly supported by a band, the band being resilient so as to be deformable inwardly of the ring axis to facilitate insertion and removal of the filter bag from a respective said orifice but with sufficient return bias to a more relaxed condition to hold the bag from separation with the baffle and seal therewith in a manner so that air must pass through the filter bag to move from said one body of gas to the other, and wherein the filter bags extend from said baffle into the second body of gas, the pressure of gas of the one body of gas being higher than the pressure of gas in the other body of gas into which the filter bags extend such that solid contaminant filtered from the air is trapped inside the bag.

In a further a further aspect the present invention may be said to be an air filtration system as hereinbefore described used as part of positive air pressure building pressurisation system.

Preferably said orifice plate of said air filtration system is installed at or near an air intake of a building through which air from outside of the building is drawn.

In a further aspect the present invention may be said to be a filter bag for use with a system as hereinbefore described.

In a further aspect the present invention may be said to be a filter bag for use with a gas filtration system, said gas filtration system comprising an orifice plate having a plurality of orifices through each of which a solid contaminant containing stream of gas to be filtered can pass from one body of gas to a second body of gas via a filter bag associated with each said orifice, wherein said filter bag is adapted and configured to associate with an orifice of the orifice plate and comprises a flexible body with an enclosed end region and a flexible ring interface region having a central ring axis and able to seal with said orifice plate in the orifice and that is annularly supported by a band, the band being resilient so as to be deformable inwardly towards the ring axis to facilitate insertion and removal of the filter hag from the orifice plate but with sufficient return bias to a more relaxed condition to hold the bag from separation with the orifice plate and seal therewith in a manner so that gas must pass through the filter bag to move from said one body of gas to said second body of gas, and wherein the filter bag, when associated with the orifice plate, extends from said orifice plate into the second body of gas, the pressure of gas of the one body of gas being higher than the pressure of gas in the second body of gas, such that solid contaminant filtered from the gas is trapped inside of the bag, the pressure of the one body of gas causing at least a partial ballooning out of the flexible body of the filter bag.

Preferably each filter bag comprising a flexible ring interface region to seal with said orifice plate in the orifice and that is annularly supported by a band or cuff, the band or cuff being resilient so as to be deformable inwardly of the ring axis to facilitate insertion and removal of the filter bag from the orifice plate but with sufficient return bias to or towards a more relaxed condition to hold the bag from separation with the orifice plate and seal therewith in a manner so that gas must pass through the filter bag to move from said one body of gas to the other.

Preferably said ring interface region comprises two axially spaced ribs between which the orifice plate locates for engagement to hold the bag from separation with the orifice plate.

Preferably the ribs are parallel and concentric.

Preferably the two ribs are part of said band or cuff.

Preferably the band or cuff has a resilient cylindrical ring that underlies a profiled ring, that profiled ring providing the ribs of the band or cuff.

Preferably said filter bag comprises of a flexible sock.

Preferably said filter bag filters insects and/or other flying and/or airbourne contaminants from air flowing into a building.

Preferably the filter bags are filter socks.

Preferably the seat and band form a female/male relationship.

Preferably the cuff of said filter bag is adapted and configured to, in a complementary manner with said orifice, be able to secure to said orifice plate.

In a further aspect the present invention may be said to be a filter bag comprising a filter bag body with an enclosed end region and a resiliently banded or ferruled mount opening for use with an orificed plate having an orifice in and by which said filter bag can be located in a manner to ensure all air passing through said orifice passes through said filter bag and solid contaminant filtered from the passing air is contained inside the bag.

Preferably said filter bag body is made from a mesh.

Preferably the mesh is a 150-800 micron mesh.

Preferably said filter bag filters insects and/or other flying and/or airbourne contaminants from air flowing into a building.

In a further aspect the present invention may be said to be an orificed barrier having a plurality of orifices through which a solid contaminant containing stream of air can be forced each orifice sealed by a filter bag via which said air can pass and be filtered, each filter bag having a mouth opening biased to an open condition to force a mouth opening seal of the filter bag against a seat of the orifice by an underlying resiliently deflectable band that is deformable inwardly to facilitate the seating with yet allow removal of the filter bag from the barrier each filter bag defining a passage but with an enclosed end region such that at least some solid contaminant can be filtered from the passing air and is contained inside the bag.

Preferably the mouth opening of the bag is biased, to force a mouth opening seal of the filter bag against a seat of the orifice, towards to a ring shape by said underlying resiliently deflectable band.

Preferably said mouth opening has, at where said resiliently deflectable band is provided, an external profile adapted to mate after a return from a deformed condition, with a complementary internal profile of a said seat.

In a further aspect the present invention may be said to be, in, as part of, or for an air intake for a building, a plurality of filter bags each seated with a seat of an orifice of a multi orificed manifold and having a mouth opening propped open, to force a seal of the filter bag against a respective seat, to a ring shape by an underlying resiliently deflectable band that is deformable inwardly towards the ring axis to facilitate the seating and removal of the filter bag from a said seat, and each bag having an enclosed end region such that solid contaminant filtered from the air entering the building is contained inside the bag.

Preferably the seating has required a resilient deformation of the mouth opening from which it has relaxed to, or been allowed to relax to, a condition that holds it engaged by a shaped seal of the filter bag and a complimentary shaped profile of the seat.

Preferably in the relaxed condition, an airtight seal is established between the seal and the seat so that all air passing through the orifice must pass through the filter bag to flow into the body of air inside the building.

In a further aspect the present invention may be said to be, in combination or assembly, a plurality of elongate filter bags each having an outwardly biased flexible mouth opening, and each engaged and inserted within a respective orifice of an orificed air flow baffle having a plurality of orifices, the flexible mouth opening having a resiliently provided end feature to engage as if meshed or otherwise engaged against easy elongate direction dislodgement, such meshing or other such engagement requiring a resilient deformation of the flexible mouth opening to allow its initial insertion before it assumes and holds its relaxed condition which is commensurate with such meshing or other engagement, each bag having an enclosed end region positioned downstream of the orifice in respect of the air flow to be filtered such that solid contaminant filtered from the air flowing through the orifice is contained inside the bag.

Also herein described is a flexible mouth opening providing filter bag to be coupled to an orificed airflow baffle by insertion into and sealing with an orifice of said baffle, said filter bag comprising:

a resiliently banded or ferruled portion that has for that border banded or ferruled zone an external profile adapted to mate after a return from a distorted form of the banded or ferruled zone with a complementary internal profile of said orifice and having an enclosed end region such that solid contaminant filtered from the air flowing through the orifice is contained inside the bag.

In a further aspect the invention can be broadly said to consist in a building that includes a room the atmosphere in which is able to be brought into a negative pressure differential to ambient atmospheric conditions outside the building, the room including a wall between the outside and the inside of the room and at which an orifice plate is mounted having at a plurality of orifices through each of which a solid contaminant containing stream of air to be filtered from the outside can pass to into the room via a filter bag associated with each said orifice, each filter bag comprising an enclosed end region defining an internal containment zone and a flexible ring interface mouth region having a central ring axis and able to seal with said orifice plate in the orifice and that is annularly supported by a band, the band being resilient so as to be deformable inwardly towards the ring axis to facilitate insertion and removal of the filter bag from the orifice plate but with sufficient return bias to a more relaxed condition to hold the bag from separation with the orifice plate and seal therewith in a manner so that air must pass through the containment zone of the filter bag to move into the room.

Preferably the internal containment zone of each filter bag projects from said plate into or towards said room.

Preferably each filter bag is encouraged for inflation by said air passing through it.

Preferably each filter bag is inflatable by said air passing through it.

Preferably each filter bag is flexible.

Preferably solid contaminant filtered from the air is trapped inside of the bag.

Preferably the plate is removably mounted to the wall.

Preferably the plate is integrated with the wall.

Preferably the wall separates the room from the outside.

Preferably no air supply ducting is provided leading up to the plate from outside.

Preferably no ducting exists downstream of the filter bags for delivering filtered air to the room.

The following apply to all previously described aspects of the invention:

Preferably the filter bag has a flexible body.

Preferably the filter bag has a mouth opening, optionally provided by a flexible ring or band.

In one embodiment the length of the body is about 50, 100, 150, 200, 250, 300, 350, 400, 450, 500, 550, 600, 650 or 700 mm.

In one embodiment the length of the body is between about 250 mm and about 450 mm in length.

In one embodiment the length of the body is between about 300 mm and about 400 mm in length.

In one embodiment the diameter of the mouth opening is about 100, 150, 200, 250, 300, 350, 400, 450, 500 or 550 mm.

In one embodiment the diameter of the mouth opening is about 200 mm to about 300 mm.

In one embodiment the ratio between the diameter of the mouth opening:the length of the body is about 1:0.5, 1:0.75, 1:1, 1:1.25, 1:1.5, 1:1.75, 1:2, 1:2.25, 1:2.5, 1:2.6, 1:2.7, 1:2.8, 1:2.9, 1:3, 1:3.1, 1:3.2, 1:3.3, 1:3.4, 1:3.5, 1:4, 1:5, 1:6 or 1:7.

In one embodiment the ratio between the diameter of the mouth opening:the length of the body is about 1:1 to about 1:2.

In one embodiment the ratio between the diameter of the mouth opening:the length of the body is about 1:1.2 to about 1:1.8.

Preferably the body is able to hang in a flaccid condition when there is no airflow passing through the orifice, and yet to balloon out when there is airflow passing through the orifice.

Preferably the body is of a length which permits the body to hang in a flaccid condition when there is no airflow passing through the orifice, and yet to balloon out when there is airflow passing through the orifice.

Preferably the body is able to balloon out to a condition wherein a central longitudinal axis of the body is perpendicular to the orifice plate.

Preferably the body is able to balloon out to a condition wherein a central longitudinal axis of the body is horizontal.

Preferably the filter bag is supported only at the mouth opening region by coupling to the orifice plate.

Preferably the body has an enclosed end region distal from the mouth opening.

Preferably the filter bag may hang in a flaccid condition when there is no airflow passing through the orifice, and wherein in its flaccid condition, the enclosed end region of the body hangs below the mouth opening.

In a further aspect the present invention may be said to be a building substantially as herein described with reference to any one or more of the accompanying drawings.

In a further aspect the present invention may be said to be a system substantially as herein described with reference to any one or more of the accompanying drawings.

As used herein the term "and/or" means "and" or "or", or both.

As used herein the term "(s)" following a noun includes, as might be appropriate, the singular or plural forms of that noun.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

BRIEF DESCRIPTION OF THE DRAWINGS

The preferred forms of the present invention will now be described with reference to the accompanying drawings in which FIG. 1 illustrates a filtration system, FIG. 2 is a cross sectional view of a filter bag located with a barrier of the filtration system of the present invention, FIG. 5 is a perspective view of a filter bag, FIG. 6 is a plan view of the filter bag of FIG. 5, FIG. 7 is a front view of the filter bag of FIG. 5, FIG. 8 is a sectional view through section AA of FIG. 6, FIG. 9 is a close up view of region B of FIG. 8, FIG. 12 is a side view of a filter bag of a slightly different configuration, FIG. 13 is a partial sectional view through the filter bag of FIG. 12, and FIG. 14 is a view illustrating a different form of barrier to the barrier of FIG. 1 with which a filter bag shown in part is engaged.

DETAILED DESCRIPTION

Figure 4:
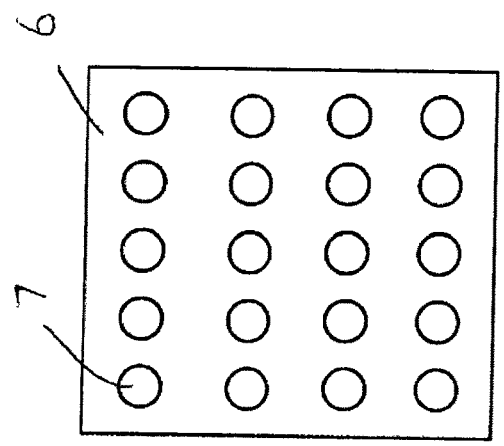
FIG. 4 is a face on view of a barrier of the filtration system of the present invention.

With reference to FIG. 1 there is shown part of a filtration system. The filtration system preferably includes a plurality of filter bags 1 that are engaged within a sealed manner to a baffle or barrier 2. The barrier is the interface two bodies of air for example internal 33 and external 34 of a building 30. Air 3 external of a building may be drawn into ducting 4 by for example a fan 5 to be driven towards the barrier 2. In other embodiments there may not be ducting upstream of the barrier, and air is instead sucked into the filtration system by a downstream blower or vacuum.

The barrier 2 may for example include a barrier plate 6 that has at least one orifice and preferably a plurality of orifices 7. Each orifice is preferably of a circular cross section. Air (for example a stream of air containing solid contaminant to be filtered out by the filtration system) can pass through the barrier plate 6 only through each orifice 7. The barrier plate at its periphery may be mounted to a holed wall 31 of the building 30 or to some other structure in a sealed manner.

Each filter bag as for example seen in FIGS. 5-9 comprises of a filter bag body 8 that is preferably made of a material suitable for filtration. Such a material may preferably be a mesh, but may be for example be a cloth, fabric, textile or other material suitable for ventilation. In preferred embodiments the material is suitable for a filtration application wherein the filtration is used for removing insects or other flying and/or airborne contaminants from air that is to be delivered into a building, in particular a building used for food processing.

The mesh may be between 150 and 800 microns. Alternative grades of mesh or other kinds of materials are also envisaged to be useful for use as part of the present invention.

Each filter bag 1 includes a mouth opening 9 via which air can pass into the filter bag body to then pass through the filter bag by virtue of a pressure differential between opposite sides of the barrier.

Figure 11:
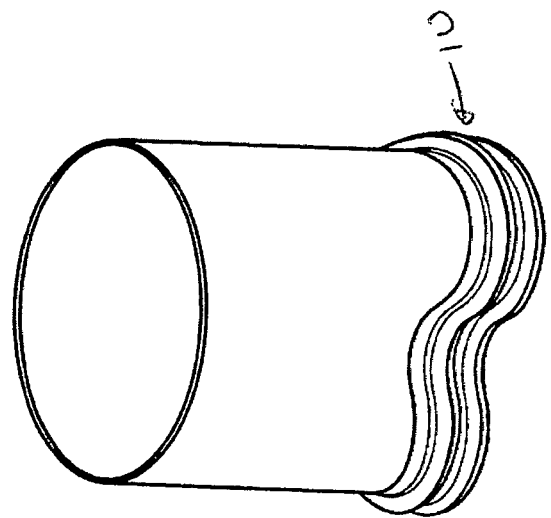
FIG. 11 shows the mouth region of the filter bag in a deformed condition for the purposes of insertion and/or removal from the barrier.

Preferably at the mouth 9 the filter bag is constructed in a manner to allow for the mouth to be moved between a relaxed condition as shown in FIG. 5 and a deformed condition as shown in FIG. 11. In the deformed condition a resilient band or cuff region 10 of the filter bag will bias the mouth back to the relaxed condition of FIG. 5. Each orifice 7 and filter bag at its cuff region is dimensioned so that in the relaxed condition a seating of the band region 10 occurs with the seat 11 of the orifice 7 of the barrier 6 as shown in FIG. 2. The band 10 is preferably profiled to have two rib regions 12 and 13 annularly positioned and substantially parallel and concentric with each other about the mouth entrance axis XX. Between the ribs a valley 14 exists or may be established when engaged with the barrier with a seat of an orifice. In some embodiments the band may be retained within a fold back of the sleeve of the filter bag body, the fold back being secured by a sewn or welded seam, for example as shown in FIG. 9.

The cuff region 10 may be of a flexible or pliable or deformable material so that when the filter bag is inserted into an orifice the resiliently biased cuff region moving back towards a relaxed state will result in a seal being established at the seat 11 of an orifice of the barrier as can be seen in for example FIG. 2.

The seat of the orifice may also include a pliable material to facilitate such sealing or alternatively may be made of a hard non-deformable or deflectable material such as a metal such as steel. In the example where the barrier 2 comprises of a steel plate 6 with the plurality of orifices therethrough as shown in FIG. 4, it is preferred that no additional modification to each orifice is done and a seal is established merely by the contact between the cuff 10 and the seat 11 of an orifice 7 of the barrier plate 6.

The filter bag body 8 is in the figures shown to be substantially cylindrical in shape however alternative configurations can be provided. By having a sufficient length L to the filter bag it will be appreciated that each filter bag has a surface area that is larger than the area of each of orifice. This will facilitate airflow through the barrier in particular when the filters start to block up as a result of them collecting insects and other air pollutants. Such larger surface area than the surface area of the orifice 7 will mean that filter bags will need to be replaced less frequently therefore resulting in less downtime of the filtration system. An increase in surface area may not just be established by virtue of lengthening the filter bags in direction L but may also occur by a ballooning out of the filter bag in a direction lateral to the direction L. As the filter bag body is flexible, and is supported only at the mouth region by coupling to the orifice plate, the bag may hang in a flaccid condition when there is no airflow passing through the orifice. However when there is airflow, this may cause the bag to inflate or balloon out to some extent.

In some embodiments the length L of the body 8 is about 50, 100, 150, 200, 250, 300, 350, 400, 450, 500, 550, 600, 650, 700 mm, and useful ranges may be selected between any of these values (for example, about 100 to about 600, about 200 to about 450, about 200 to about 500, about 250 to about 450, about 250 to about 500, about 300 to about 400, about 300 to about 450, about 300 to about 500, about 300 to about 550).

In some embodiments the diameter of the mouth 9 of the filter bag is about 100, 150, 200, 250, 300, 350, 400, 450, 500, 550 mm and useful ranges may be selected between any of these values (for example about 100 to about 550, or about 150 to about 500, or about 150 to about 350, or about 200 to about 300 mm).

Figure 3:
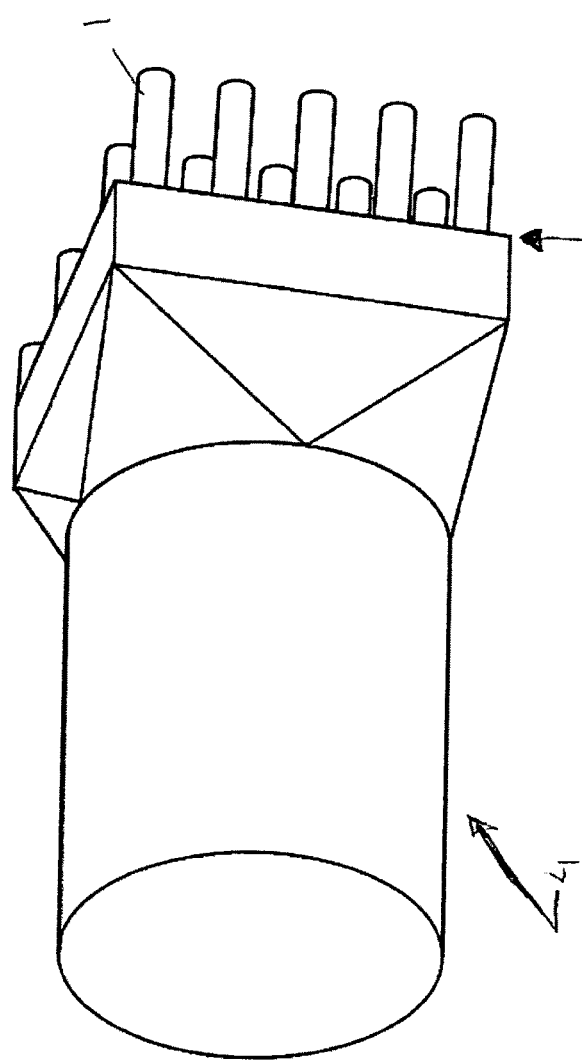
FIG. 3 is an alternative perspective view of FIG. 1.
Figure 10:
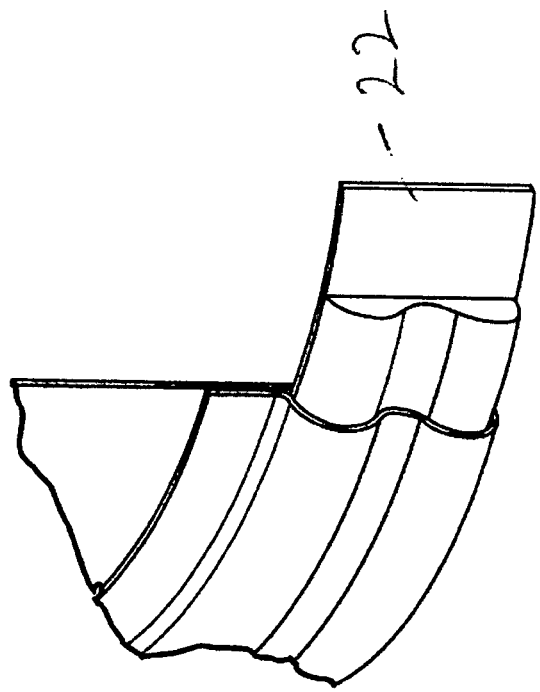
FIG. 10 is a partially exploded view of the mouth region of the filter bag.
Figure 15:
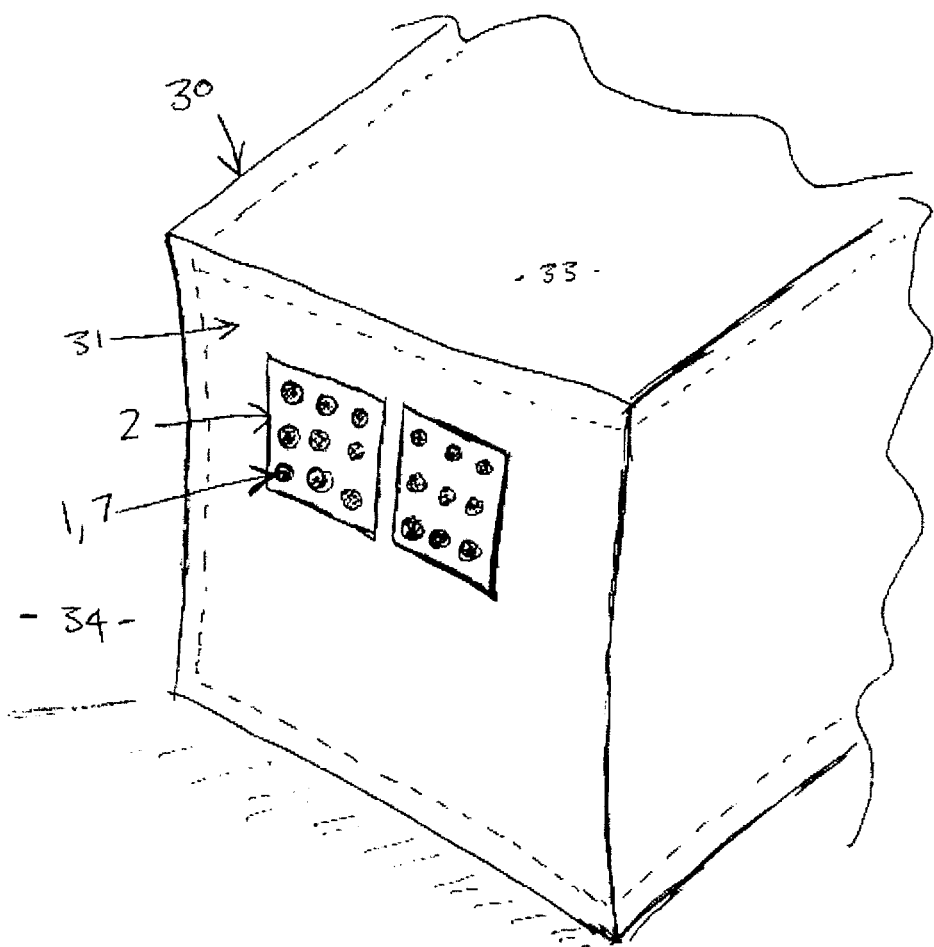
FIG. 15 shows a building that includes a room, the room including a wall between the outside and the inside of the room and at which an orificed barrier is mounted having a filter bag associated with each said orifice.

In some embodiments the ratio of the diameter of the mouth 9:length L of the body 8 is about 1:0.5, 1:0.75, 1:1, 1:1.25, 1:1.5, 1:1.75, 1:2, 1:2.25, 1:2.5, 1:2.6, 1:2.7, 1:2.8, 1:2.9, 1:3, 1:3.1, 1:3.2, 1:3.3, 1:3.4, 1:3.5, 1:4, 1:5, 1:6, 1:7 and useful ranges may be selected between any of these values (for example about 1:1 to about 1:4, about 1:1 to about 1:3, 1:1 to about 1:2, about 1:2 to about 1:3, about 1:2 to about 1:4, about 1:1.25 to about 1:1.7, about 1:1.25 to about 1:2.25) As a further example, FIG. 1 shows a ratio of the diameter of the mouth 9:length L of the body 8 as about 1:2.5. As a further example, FIG. 2 shows a ratio of the diameter of the mouth 9:length L of the body 8 as about 1:3. As a further example, FIGS. 3 and 4 show a ratio of the diameter of the mouth 9:length L of the body 8 as about 1:3. As a further example, FIG. 5 shows a ratio of the diameter of the mouth 9:length L of the body 8 as about 1:1. A preferred method of inter-engaging is as shown with reference to FIGS. 10 and 11. Here you will see there is a flexible ring 10 reliant upon the deformability and resilience of the snap ring or band 22. Upon release from the condition as shown in FIG. 11 a firm inter-engagement as shown in FIG. 2 will result. To remove the flexible ring from the inter-engagement as shown in FIG. 2 there is a similar distortion required to enable its ready removal.

In preferred forms of the present invention a suitable plastics material can be used for the band 22. It is shape retaining but can be resilient so that it can conform to the deformation required.

Many different materials single or multiple can be used for the flexible seal. One choice for the flexible sleeve proper is SEEFLEX™ sleeve material which a plastics material having little resilience but being flexible.

The sleeve can be formed from a film material, from fibres (e.g. of a non-woven material or a woven material), or some combination of them both e.g. a hybrid. Fibre examples include polyester, nylon, KEVLAR™, PTFE, polyurethane, TEFLON™, aramid, PP, etc.

Depending on usage preferably the inner surface of the flexible sleeve is to a food grade.

Alternative materials to any of those described can be used. There is no need for the material of the flexible bag to be homogeneous, i.e. it can have localised regions of different properties (e.g. material, rigidity, etc) if that is desirable in a particular application.

Whilst there has been description of a particular profiling of the end of each of the bags in question, other profiled end forms are within the scope of the invention that provide for appropriate retention. These may include one or more annular rib. One rib and a correspondingly profiled seat is shown in FIGS. 12 to 14. The seat may include one or more channels 19. It is preferred that the profiling be of an annular nature rather than helical or otherwise.

It is believed that the present invention provides industry with a useful alternative to existing apparatus and methodologies.

FIGS. 12 through 14 as described show a single annular rib 26 at the mouth opening of the filter bag to be received by a complementary profile of the seat of the orifice, here formed as a spigot 25 as part of the baffle or barrier. The rib is analogously made to the twin rib form already described.

I claim:

1. A gas filtration system for inlet air of a building ventilation system comprising:
    an orifice plate having a first side and a second side, the orifice plate being attached to a building ventilation system, wherein the orifice plate has a plurality of orifices through each of which a solid contaminant containing stream of gas to be filtered can pass from one body of gas at the first side of the orifice plate to a second body of gas at the second side of the orifice plate via a filter bag associated with each said orifice, each filter bag is flexible and comprises an enclosed end region and a flexible ring interface region having a central ring axis wherein the flexible ring interface region is able to seal with said orifice plate in the orifice and wherein each filter bag is annularly supported by a band in the flexible ring interface region and extends from the second side of the orifice plate, the band being resilient so as to be deformable inwardly towards the ring axis to facilitate insertion and removal of the filter bag from the orifice plate but with sufficient return bias to a more relaxed condition to hold the bag from separation with the orifice plate and seal therewith in a manner so that gas must pass through the filter bag to move from said one body of gas to said second body of gas, and wherein the gas filtration system is configured such that the pressure of gas of the one body of gas at the first side of the orifice plate is higher than the pressure of gas in the second body of gas at the second side of the orifice plate, wherein at least some of the solid contaminant filtered from the gas by the filter bags is trapped inside of the filter bags, and wherein the filter bags have gas entering and passing therethrough from the first body of gas to the second body of gas.

2. The gas filtration system as claimed in claim 1 wherein the orifice plate locally separates two bodies of gas that are in communication with each other only via each said filter bags.

3. The gas filtration system as claimed in claim 1 wherein each orifice and band of each associated filter bag form a female/male relationship.

4. The gas filtration system as claimed in claim 1 wherein said ring interface region comprises two axially spaced ribs between which the orifice plate locates for engagement to hold each of the filter bags from separation from the orifice plate.

5. The gas filtration system as claimed in claim 4 wherein the two ribs are parallel and concentric.

6. The gas filtration system as claimed in claim 4 wherein the two ribs are part of said band.

7. The gas filtration system as claimed in claim 4 wherein the band has a resilient cylindrical ring that underlies a profiled ring, wherein the profiled ring provides the ribs of the band.

8. The gas filtration system as claimed in claim 1 wherein each filter bag comprises of a flexible sock.

9. The gas filtration system as claimed in claim 1 wherein each filter bag comprises a filter bag body made from a mesh.

10. The gas filtration system as claimed in claim 1 wherein the filter bags are filter socks.

11. The gas filtration system as claimed in claim 1 wherein the filter bags extend into the second body of gas a distance that is greater than the diameter of the orifice at where the bag is secured.

12. The gas filtration system as claimed in claim 1 wherein the orifice plate holds all said filter bags.

13. The gas filtration system as claimed in claim 1 wherein only the orifice plate holds said filter bags.

14. The gas filtration system as claimed in claim 1 wherein the orifice plate is planar and said orifices are defined in plane.

15. The gas filtration system as claimed in claim 14 wherein the filter bags are elongate socks and their elongate direction extends in a direction parallel to normal of the orifice plate.

16. An air inlet filtration system for a building ventilation system comprising:

an airflow baffle having a first side and a second side, the airflow baffle being attached to a building ventilation system, wherein the airflow baffle has a plurality of orifices through each of which a solid contaminant containing stream of air from an air inlet to be filtered can displace from a first body of air on the first side of the baffle to a second body of air on the second side of the baffle via a filter bag associated with each said orifice, each filter bag being elongate and having an enclosed end region and comprising a flexible ring interface region wherein the flexible interface region is able to seal with a seat of said orifice and wherein each filter bag is annularly supported by a band in the flexible ring interface region and extends from the second side of the baffle, the band being resilient so as to be deformable inwardly of the ring axis to facilitate insertion and removal of the filter bag from a respective said orifice but with sufficient return bias to a more relaxed condition to hold the bag from separation with the baffle and seal therewith in a manner so that air must pass through the filter bag to move from said one body of air to the second body of air, and wherein the air filtration system is configured such that the pressure of air of the first body of air on the first side of the baffle is higher than the pressure of air in the second body of air on the second side of the baffle, and wherein at least some solid contaminant filtered from the air is trapped inside the filter bags and wherein the filter bags have air entering and passing therethrough from the first body of air to the second body of air.

17. The air filtration system as claimed in claim 16 wherein the air filtration system is configured for use as part of positive air pressure building pressurisation system.

18. An air intake for a building, comprising:

a plurality of filter bags each seated with a seat of an orifice of a multi orificed manifold connected to a ventilation system of the building, wherein the multi orificed manifold has a first side orientable towards an exterior of the building and a second side orientable towards an interior of the building, wherein each of the plurality of filter bags has a mouth opening propped open to force a seal of the filter bag against a respective seat by an underlying ring shaped resiliently deflectable band that is deformable inwardly towards the ring axis to facilitate the seating and removal of the filter bag from said respective seat, and each bag having an enclosed end region projecting from the second side of the multi orificed manifold such that at least some solid contaminant filtered from air entering the building from the exterior of the building and passing through the filter bags into the interior of the building is contained inside the filter bags.

19. A building that includes a room where atmosphere in the room is able to be brought into a negative pressure differential to ambient atmospheric conditions outside the building, the room including a wall between the outside and the inside of the room and at which an orifice plate is mounted having at a plurality of orifices through each of which a solid contaminant containing stream of air to be filtered from the outside can pass into the room as air intake via a filter bag associated with each said orifice, each filter bag comprising an enclosed end region defining an internal containment zone and a flexible ring interface mouth region having a central ring axis and able to seal with said orifice plate in the orifice, wherein each filter bag is annularly supported by a band, the band being resilient so as to be deformable inwardly towards the ring axis to facilitate insertion and removal of the filter bag from the orifice plate but with sufficient return bias to a more relaxed condition to hold the bag from separation with the orifice plate and seal therewith in a manner so that air must pass through the filter bag to move into the room and wherein at least some solid contaminant filtered from the air by the filter bags is trapped inside of the filter bags.

20. The building as claimed in claim 19 wherein an internal containment zone of each filter bag projects from said plate into or towards said room.

21. The building as claimed in claim 19 wherein each filter bag is inflated by said air passing through it.

22. The air inlet filtration system of claim 16 wherein each filter bag is flexible.

23. The air intake of claim 18 wherein each filter bag is flexible.

24. The building of claim 19 wherein each filter bag is flexible.

* * * * *